United States Patent
Shankar Iyer et al.

(10) Patent No.: US 11,075,988 B2
(45) Date of Patent: Jul. 27, 2021

(54) CONSENSUS MECHANISM FOR DISTRIBUTED SYSTEMS

(71) Applicant: KRYPC CORPORATION, New Brunswick, NJ (US)

(72) Inventors: Subramanian Ravi Shankar Iyer, Bangalore (IN); Sai Ganesh Muthuraman, Chennai (IN); Seenivasan Subramani, Chennai (IN); Ravi Jagannathan, Seattle, WA (US)

(73) Assignee: KRYPC CORPORATION, New Brunswick, NJ (US)

( * ) Notice: Subject to any disclaimer, the term of this patent is extended or adjusted under 35 U.S.C. 154(b) by 251 days.

(21) Appl. No.: 16/452,380

(22) Filed: Jun. 25, 2019

(65) Prior Publication Data
US 2020/0076889 A1    Mar. 5, 2020

(30) Foreign Application Priority Data
Aug. 31, 2018 (IN) .............................. 201841032802

(51) Int. Cl.
*H04L 29/08* (2006.01)
*G06F 9/50* (2006.01)
*H04L 9/06* (2006.01)

(52) U.S. Cl.
CPC ........ *H04L 67/1051* (2013.01); *G06F 9/5066* (2013.01); *H04L 9/0643* (2013.01)

(58) Field of Classification Search
CPC . H04L 67/1051; H04L 9/0643; G06F 9/5061; G06F 2209/505; G06F 9/5066
USPC ....................................................... 709/223
See application file for complete search history.

(56) References Cited

U.S. PATENT DOCUMENTS

| | | | |
|---|---|---|---|
| 6,687,847 B1* | 2/2004 | Aguilera ............. | G06F 11/0715 714/15 |
| 2009/0052448 A1* | 2/2009 | Ramakrishnan .... | H04L 12/1886 370/390 |
| 2016/0203522 A1* | 7/2016 | Shiffert ............. | G06Q 30/0267 705/14.58 |

(Continued)

FOREIGN PATENT DOCUMENTS

CN            103995954 A    *  8/2014

*Primary Examiner* — Umar Cheema
*Assistant Examiner* — John Fan
(74) *Attorney, Agent, or Firm* — Barry Choobin; Patent 360LLC (57) ABSTRACT

The embodiments herein provide a fair, high speed and lightweight consensus mechanism for leader election in distributed systems using coupons. The consensus mechanism uses a leader election mechanism that is randomized in twin dimensions of space and time using the concept of a colliding random walk. A source node is enabled to generate left and right coupons in a quantum resistant manner for random walks. Two novel coupon processing mechanisms called Process Execution Time Synchronization (PETS) mechanism and Single Queue (SQ) mechanism are used to process the coupons and find matches. The use of PETS optimizes memory and time requirements while SQ is extremely fast and efficient to handle large volumes of coupons. Also, the coupon forwarding to neighbouring nodes is performed based on three algorithms namely Uniform, Delay and Adaptive Delay forward. These forwarding algorithms effect high fairness even in case of open networks.

9 Claims, 7 Drawing Sheets (56) References Cited

U.S. PATENT DOCUMENTS

2017/0085640 A1\* 3/2017 Mandal ................ H04L 67/104
2017/0206611 A1\* 7/2017 Morgia .................. H04L 67/10

\* cited by examiner

CONSENSUS MECHANISM FOR DISTRIBUTED SYSTEMS

CROSS-REFERENCE TO RELATED APPLICATIONS

The embodiments herein claim the priority of the Indian Provisional Patent Application No. 201841032802 filed on Aug. 31, 2018 with the title "A NOVEL CONSENSUS MECHANISM FOR DISTRIBUTED SYSTEMS", and the contents of which is included entirely as reference herein.

BACKGROUND

Technical Field

The embodiments herein are generally related to the field of distributed systems. The embodiments herein are particularly related to consensus mechanism in distributed systems. The embodiments herein are more particularly related to a fair, high speed, and lightweight consensus mechanism for leader election in distributed systems using coupons.

Description of the Related Art

A distributed system is a system whose components are located on different networked computers (possibly in disparate geographical locations) which communicate and coordinate their actions by passing the messages to each other. The networked computers in the distributed system are typically called nodes or peers which interact with each other to achieve a common goal. Peer-to-peer (P2P) computing or networking is a class of distributed applications that partitions tasks or workloads between peers. One such P2P system is Blockchain which is a decentralized peer-to-peer system. In Blockchain, transaction information is collected and encapsulated in a digital envelope called "block" and this block is then cryptographically added to the end of a chain of other transactions. The nodes need to come to a consensus using a consensus mechanism to make decisions (selecting leader on ordering of transactions) in this type of decentralized systems The consensus mechanism for blockchains primarily focuses on who creates the block. Thus, a performance of the consensus algorithms in blockchain is often limited by the speed of leader node election. There are several consensus mechanisms suggested in the art for this purpose. Some of the commonly used consensus mechanisms include Paxos and Raft, Proof of Work (PoW), Proof of Stake (PoS), Delegated Proof of Stake, Proof of Importance, mining diversity, Proof of Authority (PoA), Proof of Activity, Proof of Space, Proof of Elapsed Time (PoET), Practical Byzantine Fault Tolerance (PBFT), Crash Fault Tolerance (XFT) in Hyperledger and Federated Byzantine Agreement.

However, most of the existing consensus algorithms are too complex and resource hungry to run on a plurality of constrained devices. Some other commonly encountered issues while using these existing consensus mechanisms include energy inefficiency, lower throughput, high latency, fairness/centralization concerns, scalability concerns, dependence on specialized hardware from single source etc.

Hence, there is a need for providing a high speed, lightweight and fair consensus mechanism in the distributed systems. There is also a need for providing a consensus mechanism for distributed systems that consumes lesser memory and computational resources. Further, there is a need for providing a system for handling high throughput with low latency using light weight tokens/coupons as a communication means among peers in P2P network for consensus based leader election. Still further, there is a need for providing a mechanism in each node within a P2P network to process the coupon and forward to the neighbours asynchronously.

The above-mentioned shortcomings, disadvantages and problems are addressed herein and which will be understood by reading and studying the following specification.

OBJECTS OF THE EMBODIMENTS

The primary object of the embodiments herein is to provide a high speed, lightweight and fair consensus mechanism for use in distributed systems.

Another object of the embodiments herein is to provide a novel consensus mechanism for the distributed systems with a consumption of lesser memory and computational resources.

Yet another object of the embodiments herein is to provide a system and method for coupon forwarding and processing in the distributed systems.

Yet another object of the embodiments herein is to provide a system and method for coupon processing to make use of a buffer and hash-table to process coupons and find matches.

Yet another object of the embodiments herein is to provide two novel coupon processing mechanisms namely Process Execution Time Synchronization (PETS) Mechanism and Single Queue mechanism (SQ.

Yet another object of the embodiments herein is to provide a system for coupon processing that uses PETS mechanism for getting improved network throughput by electing a plurality of leaders in parallel.

Yet another object of the embodiments herein is to provide a system for coupon processing that uses SQ mechanism for getting improved network throughput by reducing the time taken for leader election in a sequential manner.

Yet another object of the embodiments herein is to provide a system and method for coupon processing at a node in the distributed network regardless of clock synchronization among all the other nodes within a network.

Yet another object of the embodiments herein is to provide a system and method for leader election in distributed systems to provide a reusable low level service which is used by a high level application such as blockchain, distributed ledger etc.

These and other objects and advantages of the embodiments herein will become readily apparent from the following detailed description taken in conjunction with the accompanying drawings.

SUMMARY

The various embodiments herein provide a system for providing a fair, high speed and lightweight consensus mechanism for use in distributed networks. The system comprises a peer-to-peer distributed network comprising a plurality of nodes (computing devices) connected over a communication network. Each node in the network is capable of communicating with one or more of the other nodes in the network over a bi-directional communication link. Each node also comprises a Proof of Match AdativeAlgorithm (PoMA) module. The PoMA module comprises a coupon generation module configured for generating one or more software coupons. Each software coupon comprises a set of Left (L) and Right (R) coupons, and wherein each L and R coupon comprises a hash value part and one or more identifiers. The PoMA module also comprises a coupon forwarding module configured for forwarding the L and R coupons generated by a source node by selecting two neighbouring nodes at random and forwarding the L coupon to the first node and R coupon to the second node. The coupon forwarding module is further configured for forwarding the L and R coupons received from any other node using one or more algorithms based on the network topology. The one or more algorithms comprise uniform forwarding, delay forwarding and adaptive delay forwarding. The PoMA further comprises a coupon processing module configured for processing the received L and R coupons to identify a potential match of the coupons. The coupon processing module is further configured for verifying potentially matched L and R coupons using one or more identifiers to determine an exact match. The determination of exact match is identified as consensus being reached amongst the nodes.

According to one embodiment herein, the coupon forwarding module is configured for using uniform forwarding algorithm for a complete network by randomly selecting a connected node and forwarding the coupon. The coupon forwarding module is further configured for using delay forwarding algorithm for a high density non complete, connected network with known number of nodes by randomly selecting a node in the network and forwarding the coupon only when the selected node is a connected node and retaining the coupon for a hop otherwise. The coupon forwarding module is still further configured for using adaptive delay algorithm for a high density partially connected network topology with unknown number of nodes by estimating the number of nodes in the network, randomly selecting a node out of estimated number of nodes and forwarding the coupon to the selected node only when the selected node is a connected node and retaining the coupon for a hop otherwise.

According to one embodiment herein, the coupon processing module further comprises a Process Execution Time Synchroniser (PETS) processor and a Single Queue (SQ) processor for processing the received coupons. The PETS processor is used for coupon processing to improve network throughput by electing a plurality of leaders in parallel. The SQ processor is used for coupon processing to improve network throughput by reducing the time taken for leader election in a sequential manner.

According to one embodiment herein, the PETS processor comprises a plurality of ingress queue buffers, an egress queue buffer and a hash table. The coupons from the head of one of the ingress queue are compared with the entries in the hash table to identify a potential match using coupon hash value. The coupons from the filled ingress queue buffer are processed first and the incoming requests are forwarded to another empty ingress queue buffer unless all the coupons from the filled ingress queue buffer are processed. The PETS processor is further configured for clearing the hash table at the end of every hop and adding the processed unmatched coupons to the egress queue buffer for forwarding to other neighbouring nodes.

According to one embodiment herein, the SQ processor comprises a single ingress queue buffer, a hash table and an egress queue buffer. The coupons from the head of ingress queue buffer are taken sequentially and are compared with the entries in the hash table to identify a potential match using coupon hash value. The SQ mechanism is further configured for storing the copy of the coupon locally before forwarding to other neighbouring nodes. A copy of coupon is stored at every node to enable building up a path trace of the coupon to increase coupon matching probability.

According to one embodiment herein, a method for providing a fair, high speed and lightweight consensus mechanism for use in distributed networks is provided. The method comprises the steps of generating two coupons namely left coupon (L-coupon) and right coupon (R-coupon) using a coupon generation module present in a node (computing device) that is part of a —peer distributed network. The method also comprises forwarding the L and R coupons in the network using coupon forwarding module to neighbouring nodes. Each L and R coupon comprises a hash value part and one or more identifiers. The method also comprises comparing the received coupons for identifying a potential match between the L and R coupons using coupon processing module and forwarding the potentially matched coupons to a matching algorithm to determine an exact match between the L and R coupons in order to reach consensus amongst the nodes.

According to one embodiment herein, the step of forwarding the L and R coupons in the network using coupon forwarding module further comprises the steps of determining the network topology to be either complete, non-complete connected with known number of nodes or non-complete connected with unknown number of nodes. The method also comprises using a uniform forwarding algorithm in case the determined network topology is a complete graph and forwarding the L and R coupon to a randomly select connected node. The method further comprises using delay forwarding algorithm in case the determined network topology is a non-complete connected graph with known number of nodes. The delay forwarding algorithm randomly selects a node from the network and forwards the coupon if the selected node is also a connected node and retains the coupon for a hop otherwise. The method still further comprises using adaptive delay forwarding algorithm in case the determined network topology is a non-complete connected graph with unknown number of nodes. The adaptive delay forwarding algorithm estimates the number of nodes in a network, randomly selects a node from the estimated size of network and forwards the coupon if the selected node is also a connected node and retains the coupon for a hop otherwise.

According to one embodiment herein, the method further comprises the step of processing the received coupons using either PETS processor or SQ processor. The PETS processor is used for coupon processing to improve network throughput by electing a plurality of leaders in parallel. The SQ processor is used for coupon processing to improve network throughput by reducing the time taken for leader election in a sequential manner.

According to one embodiment herein, the step of processing the received coupons using PETS processor further comprises filling the received coupons into an ingress queue that is empty from a plurality of ingress queues provided in the PETS processor. The method also comprises taking one coupon at a time from the head of the filled ingress queue and adding it to a hash table provided in the PETS processor. The method further comprises diverting all other received coupons to another ingress queue to avoid any loss of coupon due to processing time and comparing the coupons in the hash table using hash value part of each coupon to identify a potential match of the L and R coupons. The method still further comprises adding the unmatched coupons to an egress queue for forwarding to other nodes and forwarding the potentially matched coupons to a matching algorithm to confirm exact match between the L and R coupons in order to reach consensus amongst the nodes.

According to one embodiment herein, the step of processing the received coupons using SQ processor further comprises receiving the coupons using a single ingress queue provided in the SQ processor and taking the coupons from the head of ingress queue and adding to the hash table. The method also comprises comparing the coupons in the hash table using hash value part of each coupon to identify a potential match of the L and R coupons. The method further comprises comparing the coupons in the hash table using hash value part of each coupon to identify a potential match of the L and R coupons. The method still further comprises adding the unmatched coupons to an egress queue for forwarding to other nodes and forwarding the potentially matched coupons to a matching algorithm to confirm exact match between the L and R coupons in order to reach consensus amongst the nodes.

The various embodiments herein provide a fair, high speed and lightweight consensus mechanism for leader node/election in the distributed systems using coupons. The consensus mechanism of the embodiments herein is referred to as "Proof-of-Match-Adaptive" (PoMA) herein after in the disclosure. PoMA implements an algorithm for handling the large volumes of data, the high rates of data transfer, and the large varieties of data, that are expected to be handled in distributed systems, such as blockchains, required for the implementation of business applications (e.g. using IoT devices, online retail etc.) on a large scale.

According to one embodiment herein, in Proof-of-Match-Adaptive, a node (source vertex), that needs to accomplish a task, generates two coupons (a pair of Simple Random Walks (SRW)) namely left coupon (L-coupon) and right coupon (R-coupon) using a coupon generation module. The source node then initiates a set of colliding random walks on the network using these L and R coupons. These coupons are forwarded in the network using coupon forwarding module to neighbouring nodes. When the two SRWs visit the same vertex simultaneously, the receiving node claims a collision or match and the SRWs are terminated. Such a receiving node is then identified as a leader node and gains the right to perform a specific task. The task of coupon matching is performed using a coupon matching module.

According to one embodiment herein, the mechanism allows the variants of this form for generating and forwarding the coupons from the source vertex. The source vertex also uses a novel fault tolerance mechanism referred to as "m-ling" herein after in the present disclosure. In m-Ling, a source vertex is configured for generating multiple CRWs for each piece of work that needs to be done (e.g., each set of transactions to be processed). Thus, instead of initiating one CRW for each piece of work that needs to be done, in m-Ling, m (m>1) simultaneous CRWs are initiated by the source vertex. All the coupons (L- and R-coupons) carry the same walk identifier.

According to one embodiment herein, a method for coupon processing in the distributed systems is provided. The method comprises receiving the coupons using two ingress queues. The method also comprises taking coupons from the head of the ingress queue and adding to a hash table. The method further comprises identifying a potential match between the coupons when two coupons have the same match hash. The method still further comprises sending references of potentially matched coupons to a separate thread that verifies whether the coupons are indeed a corresponding pair of L- and R-coupons. The method still further comprises taking out the pair of coupons from the hash table when the match is confirmed and forwarding the two coupons to a higher level protocol for further action. The method still further comprises keeping the coupons to remain in the hash table till emptied after all the coupons in the current queue are forwarded if no match is found.

According to one embodiment herein, a method for coupon matching is provided. The method comprises the steps of sending matched coupons to a matching algorithm that operates on a separate thread. The coupon type field is checked for confirming the presence of a pair of L and R-coupons. On confirmation, the number of data elements contained in the R-coupon is compared with the number of parameters required by the code in the L-coupon. When both are found to be equal, the matching algorithm is configured to run a function in the L-coupon using the data elements in the R-coupon. The value returned by the function (always a valid hash) is then compared with the value of the match hash. When these match with each other, the matching algorithm is configured to remove the two coupons from the hash table and forward the information contained in the two coupons to a higher level protocol. In case the coupons do not match, then the matching algorithm is configured to return an error message and the two coupons are not deleted from the hash table.

According to one embodiment herein, a method for coupon forwarding is provided. The method uses three forwarding algorithms for coupon forwarding depending on various conditions. The three algorithms comprise Uniform Forward, Delay Forward and Adaptive Delay Forward. The variance in the probability of collision across vertices is low for the delay forward algorithm and is the least for the adaptive delay forward algorithm. The Delay Forward mechanism is applicable only in networks whose size is known at all time and whose densities are fairly high (typically 0.6 and above). The Adaptive Delay Forward is suitable for networks of high densities, that are permission less, open and dynamic (hence the number of nodes is unknown).

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Although the specific features of the embodiments herein are shown in separate drawings, it is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for providing a fair, high speed and lightweight consensus mechanism for use in distributed networks. The system comprises a peer-to-peer distributed network comprising a plurality of nodes (computing devices) connected over a communication network. Each node in the network is capable of communicating with one or more of the other nodes in the network over a bi-directional communication link. Each node also comprises a Proof of Match Adaptive Algorithm (PoMA) module. The PoMA module comprises a coupon generation module configured for generating one or more software coupons. Each software coupon comprises a set of Left (L) and Right (R) coupons, and wherein each L and R coupon comprises a hash value part and one or more identifiers. The PoMA module also comprises a coupon forwarding module configured for forwarding the L and R coupons generated by a source node by selecting two neighbouring nodes at random and forwarding the L coupon to the first node and R coupon to the second node. The coupon forwarding module is further configured for forwarding the L and R coupons received from any other node using one or more algorithms based on the network topology. The one or more algorithms comprise uniform forwarding, delay forwarding and adaptive delay forwarding. The PoMA further comprises a coupon processing module configured for processing the received L and R coupons to identify a potential match of the coupons. The coupon processing module is further configured for verifying potentially matched L and R coupons using one or more identifiers to determine an exact match. The determination of exact match is identified as consensus being reached amongst the nodes.

According to one embodiment herein, the coupon forwarding module is configured for using uniform forwarding algorithm for a complete network topology by randomly selecting a connected node and forwarding the coupon. The coupon forwarding module is further configured for using delay forwarding algorithm for a high density non-complete connected network topology with known number of nodes by randomly selecting a node in the network and forwarding the coupon only when the selected node is a connected node and retaining the coupon for a hop otherwise. The coupon forwarding module is still further configured for using adaptive delay algorithm for a high density non-complete connected network topology with unknown number of nodes by estimating the number of nodes in the network, randomly selecting a node out of estimated number of nodes and forwarding the coupon to the selected node only when the selected node is a connected node and retaining the coupon for a hop otherwise.

According to one embodiment herein, the coupon processing module further comprises a Process Execution Time Synchroniser (PETS) processor and a Single Queue (SQ) processor for processing the received coupons. The PETS processor is used for coupon processing to improve network throughput by electing a plurality of leaders in parallel. The SQ processor is used for coupon processing to improve network throughput by reducing the time taken for leader election in a sequential manner.

According to one embodiment herein, the PETS processor comprises a plurality of ingress queue buffers, an egress queue buffer and a hash table. The coupons from the head of one of the ingress queue are compared with the entries in the hash table to identify a potential match using coupon hash value. The coupons from the filled ingress queue buffer are processed first and the incoming requests are forwarded to another empty ingress queue buffer unless all the coupons from the filled ingress queue buffer are processed. The PETS processor is further configured for clearing the hash table at the end of every hop and adding the processed unmatched coupons to the egress queue buffer for forwarding to other neighbouring nodes.

According to one embodiment herein, the SQ processor comprises a single ingress queue buffer, a hash table and an egress queue buffer. The coupons from the head of ingress queue buffer are taken sequentially and are compared with the entries in the hash table to identify a potential match using coupon hash value. The SQ mechanism is further configured for storing the copy of the coupon locally before forwarding to other neighbouring nodes. A copy of coupon is stored at every node to enable building up a path trace of the coupon to increase coupon matching probability.

According to one embodiment herein, a method for providing a fair, high speed and lightweight consensus mechanism for use in distributed networks is provided. The method comprises the steps of generating two coupons namely left coupon (L-coupon) and right coupon (R-coupon) using a coupon generation module present in a node (computing device) that is part of a —peer distributed network. The method also comprises forwarding the L and R coupons in the network using coupon forwarding module to neighbouring nodes. Each L and R coupon comprises a hash value part and one or more identifiers. The method also comprises comparing the received coupons for identifying a potential match between the L and R coupons using coupon processing module and forwarding the potentially matched coupons to a matching algorithm to determine an exact match between the L and R coupons in order to reach consensus amongst the nodes.

According to one embodiment herein, the step of forwarding the L and R coupons in the network using coupon forwarding module further comprises the steps of determining the network topology to be either complete, non-complete connected with known number of nodes or non-complete connected with unknown number of nodes. The method also comprises using a uniform forwarding algorithm in case the determined network topology is a complete graph and forwarding the L and R coupon to a randomly select connected node. The method further comprises using delay forwarding algorithm in case the determined network topology is a non-complete connected graph with known number of nodes. The delay forwarding algorithm randomly selects a node from the network and forwards the coupon if the selected node is also a connected node and retains the coupon for a hop otherwise. The method still further comprises using adaptive delay forwarding algorithm in case the determined network topology is a non-complete connected graph with unknown number of nodes. The adaptive delay forwarding algorithm estimates the number of nodes in a network, randomly selects a node from the estimated size of network and forwards the coupon if the selected node is also a connected node and retains the coupon for a hop otherwise.

According to one embodiment herein, the method further comprises the step of processing the received coupons using either PETS processor or SQ processor. The PETS processor is used for coupon processing to improve network throughput by electing a plurality of leaders in parallel. The SQ processor is used for coupon processing to improve network throughput by reducing the time taken for leader election in a sequential manner.

According to one embodiment herein, the step of processing the received coupons using PETS processor further comprises filling the received coupons into an ingress queue that is empty from a plurality of ingress queues provided in the PETS processor. The method also comprises taking one coupon at a time from the head of the filled ingress queue and adding it to a hash table provided in the PETS processor. The method further comprises diverting all other received coupons to another ingress queue to avoid any loss of coupon due to processing time and comparing the coupons in the hash table using hash value part of each coupon to identify a potential match of the L and R coupons. The method still further comprises adding the unmatched coupons to an egress queue for forwarding to other nodes and forwarding the potentially matched coupons to a matching algorithm to confirm exact match between the L and R coupons in order to reach consensus amongst the nodes.

According to one embodiment herein, the step of processing the received coupons using SQ processor further comprises receiving the coupons using a single ingress queue provided in the SQ processor and taking the coupons from the head of ingress queue and adding to the hash table. The method also comprises comparing the coupons in the hash table using hash value part of each coupon to identify a potential match of the L and R coupons. The method further comprises comparing the coupons in the hash table using hash value part of each coupon to identify a potential match of the L and R coupons. The method still further comprises adding the unmatched coupons to an egress queue for forwarding to other nodes and forwarding the potentially matched coupons to a matching algorithm to confirm exact match between the L and R coupons in order to reach consensus amongst the nodes.

The various embodiments herein provide a fair high speed and lightweight consensus mechanism for leader node election in the distributed systems using coupons. The consensus mechanism of the embodiments herein is referred to as "Proof-of-Match-Adaptive" (PoMA) herein after in the disclosure. PoMA implements an algorithm for handling the large volumes of data, the high rates of data transfer, and the large varieties of data, that are expected to be handled in distributed systems, such as blockchains, required for the implementation of business applications (e.g. using IoT devices, online retail etc.) on a large scale.

According to one embodiment herein, in Proof-of-Match-Adaptive, a node (source vertex), that needs to accomplish a task, generates two coupons (a pair of Simple Random Walks (SRW)) namely left coupon (L-coupon) and right coupon (R-coupon) using a coupon generation module. The source node then initiates a set of colliding random walks on the network using these L and R coupons. These coupons are forwarded in the network using coupon forwarding module to neighbouring nodes. When the two SRWs visit the same vertex simultaneously, the receiving node claims a collision or match and the SRWs are terminated. Such a receiving node is then identified as a leader node and gains the right to perform a specific task. The task of coupon matching is performed using a coupon matching module.

According to one embodiment herein, the mechanism allows the variants of this form for generating and forwarding the coupons from the source vertex. The source vertex also uses a novel fault tolerance mechanism referred to as "m-ling" herein after in the present disclosure. In m-Ling, a source vertex is configured for generating multiple CRWs for each piece of work that needs to be done (e.g., each set of transactions to be processed). Thus, instead of initiating one CRW for each piece of work that needs to be done, in m-Ling, m (m>1) simultaneous CRWs are initiated by the source vertex. All the coupons (L- and R-coupons) carry the same walk identifier.

According to one embodiment herein, a method for coupon processing in the distributed systems is provided. The method comprises receiving the coupons using two ingress queues. The method also comprises taking coupons from the head of the ingress queue and adding to a hash table. The method further comprises identifying a potential match between the coupons when two coupons have the same match hash. The method still further comprises sending references of potentially matched coupons to a separate thread that verifies whether the coupons are indeed a corresponding pair of L- and R-coupons. The method still further comprises taking out the pair of coupons from the hash table when the match is confirmed and forwarding the two coupons to a higher level protocol for further action. The method still further comprises keeping the coupons to remain in the hash table till emptied after all the coupons in the current queue are forwarded if no match is found.

According to one embodiment herein, a method for coupon matching is provided. The method comprises the steps of forwarding matched coupons to a matching algorithm that operates on a separate thread. The coupon type field is checked for confirming the presence of a pair of L and R-coupons. On confirmation, the number of data elements contained in the R-coupon is compared with the number of parameters required by the code in the L-coupon. When both are found to be equal, the matching algorithm is configured to run a function in the L-coupon using the data elements in the R-coupon. The value returned by the function (always a valid hash) is then compared with the value of the match hash. When these match with each other, the matching algorithm is configured to remove the two coupons from the hash table and forward the information contained in the two coupons to a higher level protocol. In case the coupons do not match, then the matching algorithm is configured to return an error message and the two coupons are not deleted from the hash table.

According to one embodiment herein, a method for coupon forwarding is provided. The method uses three forwarding algorithms for coupon forwarding depending on various conditions. The three algorithms comprise Uniform Forward, Delay Forward and Adaptive Delay Forward. The variance in the probability of collision across vertices is low for the delay forward algorithm and is the least for the adaptive delay forward mechanism. The Delay Forward mechanism is applicable only in networks whose size is known at all time and whose densities are fairly high (typically 0.6 and above). The Adaptive Delay Forward is suitable for networks of high densities, that are permissionless, open and dynamic (hence the number of nodes is unknown).

Figure 1:
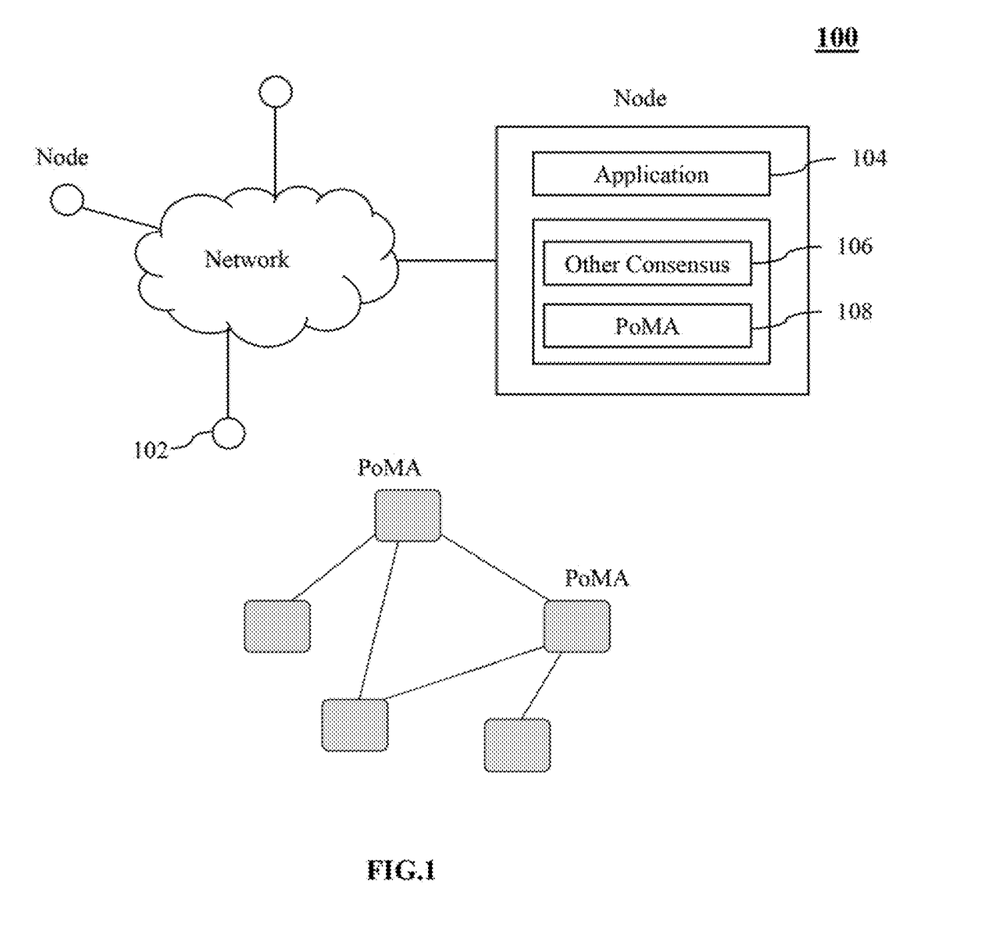
FIG. 1 illustrates a block diagram of a distributed system, according to an embodiment herein.

FIG. 1 illustrates a top level architecture diagram of a distributed system, according to one embodiment herein. With respect to FIG. 1, the system comprises a Peer to Peer distributed network of a plurality of nodes 102 (computing devices) connected over a communication network. Each node in the distributed network comprises the application layer 104, other consensus 106 and a Proof of Match Adaptive Algorithm (PoMA) module 108. Each node in the network is capable of communicating with one or more of the other nodes in the network over communication links (edges). Nodes are identified by their respective addresses in the network. Two nodes are said to be adjacent or neighbours when each is aware of the other's address and is able to directly communicate with each other. While it is possible that communication may be one-sided, that is, one node may have the address of another but not vice-versa. In this disclosure, it is assumed that communication over an edge is bi-directional. That is, if a node v1 is the neighbour of a node v2, then v2 is also a neighbour of v1.

Figure 2:
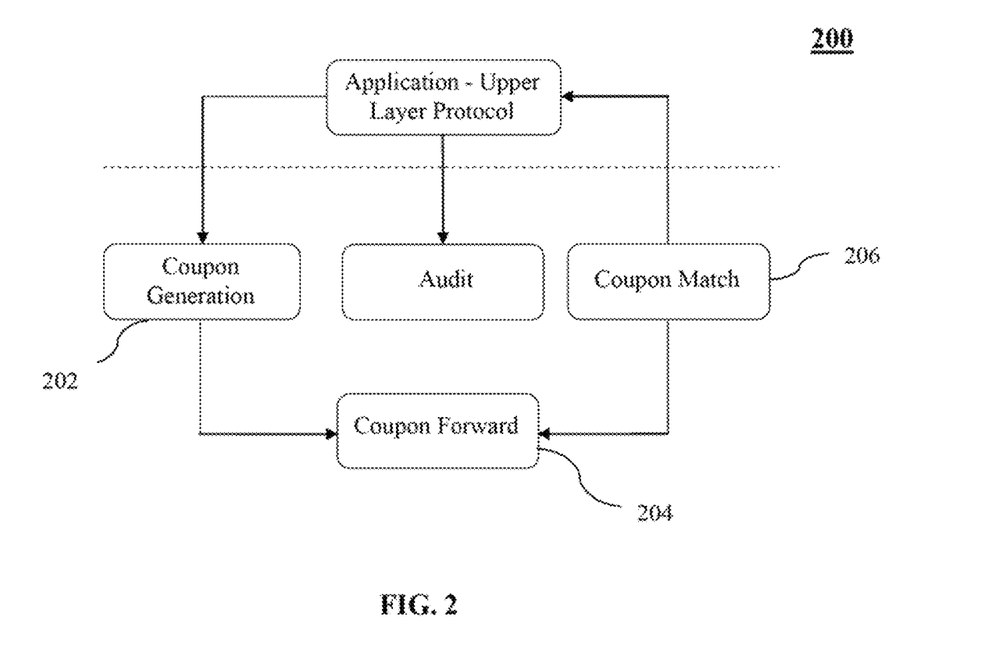
FIG. 2 illustrates a block diagram of a node in a distributed system that uses colliding random walks (CRW) for leader election, according to one embodiment herein.

FIG. 2 illustrates a block diagram of a node in a distributed system that uses colliding random walks (CRW) for leader election, according to one embodiment herein. With respect to FIG. 2, each PoMA module 108 further comprises the coupon generation module 202, the coupon forwarding module 204 and the coupon matching module 206. According to one embodiment herein, the various modules present in the system can be implemented using software, hardware or a combination thereof.

According to one embodiment herein, the node 102 in the given network generates a software token called a coupon using the coupon generation module 202. This coupon is sent to another node chosen at random from one of its neighbors. In one example embodiment, the node for sending coupon is selected in accordance with a probability distribution such as the Uniform Distribution. The node that receives the coupon, in turn, forwards this coupon to one of the neighbors. This process of each node receiving a coupon from the neighbor and forwarding randomly to another neighboring node is termed as a Simple Random Walk (SRW). Each step of an SRW involves a coupon travelling exactly one hop to a randomly selected node. The process of a SRW begins with some node in the network initiating the coupon forwarding. The process continues until some receiving node discontinues the forwarding process (called dropping the coupon) based on some pre-decided criterion such as the maximum number of hops permitted for that SRW (which is nothing but the total time coupon spent on the network).

According to one embodiment herein, the SRW is said to visit a node "v" on receiving the corresponding coupon. For non-complete connected graphs with moderate to high densities (greater than or equal to 0.4), the number of visits the SRW makes to each vertex correlates very highly with the eigenvector centrality measure of the vertex.

According to one embodiment herein, the node in a network simultaneously generates multiple simple random walks (Multiple Random Walks) during any time interval. The number of such simple random walks generated during a given time interval vary from node to node. Furthermore, any node is enabled to generate different numbers of simple random walks during different intervals of time. This allows the nodes in a network to exploit the properties of multiple random walks to optimize the performance of the distributed application running on the network. Every node in a network comprises mechanisms to manage multiple and potentially large numbers of visits in a given interval of time. Statistics like the mean arrival rate (which is the average number of coupons received by the node in a hop) and the mean collision rate (which is the number of collisions at a node in a hop) correlate highly with the eigenvector centrality measures of the nodes of the graph.

According to one embodiment herein, in CRW, a source vertex initiates a pair of SRWs as explained above. The coupons of the SRW carry information such that when the two SRWs (same pair) visit a particular node/vertex simultaneously the receiving node claims a collision or match and the SRWs are terminated. Such a receiving node is then identified as a leader and gains the right to perform a specific task. As the walks follow random paths, such a process ensures fairness.

According to one embodiment herein, a variant of CRW is called as a "Path-Colliding Random Walk (PCRW)". In PCRW, a collision is said to happen when a coupon visits a node previously visited by its complementary coupon. A restriction on such a colliding random walk is the k-PCRW. In such PCRW, a collision is said to happen only when a coupon visits a node among the last k nodes visited by its complementary coupon. For example, a 2-PCRW is PCRW, in which a collision is said to happen only when a coupon visits one of the last 3 nodes (last two nodes+the current node) visited by its complementary coupon. The term "PCRW", without a qualifier indicates a Path Colliding Random Walk in which there is no restriction on the number of nodes in the path of a coupon to be considered for a collision. The process of coupon generation is identical in both types of CRW's.

According to one embodiment herein, the coupon processing module 206 is configured for processing the received L and R coupons to identify a potential match of the coupons. The coupon processing module is further configured for verifying potentially matched L and R coupons using one or more identifiers to determine an exact match. The determination of exact match is identified as consensus being reached amongst the nodes.

According to one embodiment herein, the coupon processing module 206 further comprises a Process Execution Time Synchroniser (PETS) processor and a Single Queue (SQ) processor for processing the received coupons. The PETS processor is used for coupon processing to improve network throughput by electing a plurality of leaders parallel. The SQ processor is used for coupon processing to improve network throughput by reducing the time taken for leader election in a sequential manner. Thus, the PETS processor is used in case of traditional CRW's while SQ processor is used in case of PCRW's.

Figure 3:
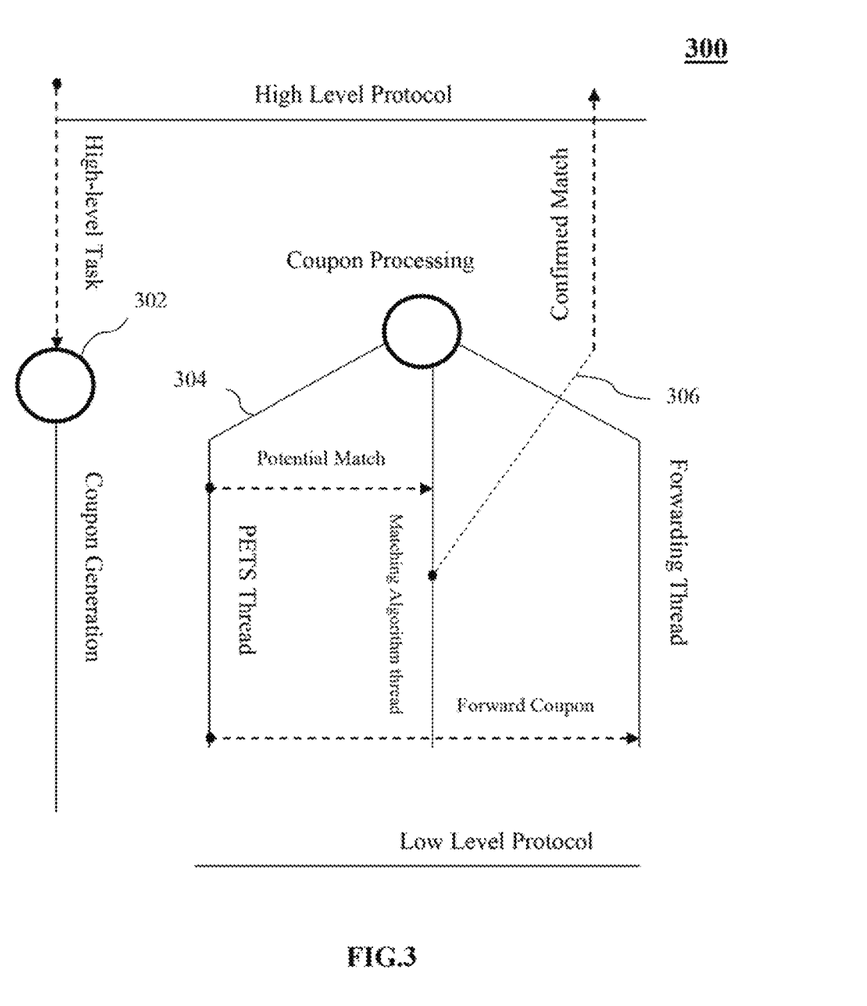
FIG. 3 illustrates a schematic representation of the PETS mechanism, according to one embodiment herein.

FIG. 3 illustrates a schematic diagram depicting the Process Execution Time Synchronization (PETS) mechanism, according to one embodiment herein. In case of distributed network, a high level protocol/application such as blockchain, ledger reuses the lower level services of consensus based leader election. With respect to FIG. 3, in PETS mechanism every node processes the received coupons to check for matching L- and R-coupons. When no match is found, the node forwards the coupons to its neighbors. At the same time, the system needs to be cognizant of the volume of coupons it needs to process. With respect to FIG. 3, the circles 302 indicate processes, bold lines 304 indicate threads and dotted lines 306 indicate inter-process/inter-thread communication.

According to one embodiment herein, every node processes the coupons received via high level protocol. For the source node, one of the threads identifies high level task and initiates a process to generate a coupon. Other nodes, on receiving coupons, perform coupon processing via a process that in-turn initiates a thread to identify potential match of the received coupon. Two coupons are identified as a potential match when the hash value part of both L and R coupon are same. The potential match L and R coupons are then further processed to identify the exact match. Upon identifying the potential match, the thread communicates via inter process communication to another thread to perform matching algorithm.

According to one embodiment herein, match of L and R coupon is identified using other identifiers present in the coupon along with the match hash value. Additionally the matching algorithm executes a function that is part of one of the coupon using the data present in another coupon and when the value is confirmed to be same the match is identified. When matching algorithm identifies confirmed match, another inter process thread informs the source node via high level protocol about the match. In case of non-match of coupons, yet another thread forwards the coupons to the neighbours. Similarly during the processing of thread to identify the potential match, in case if the potential match is not identified the thread forwards coupons to another thread using inter process communication. The forwarding thread then forwards these coupons to other connected neighbors in the P2P network.

Figure 4:
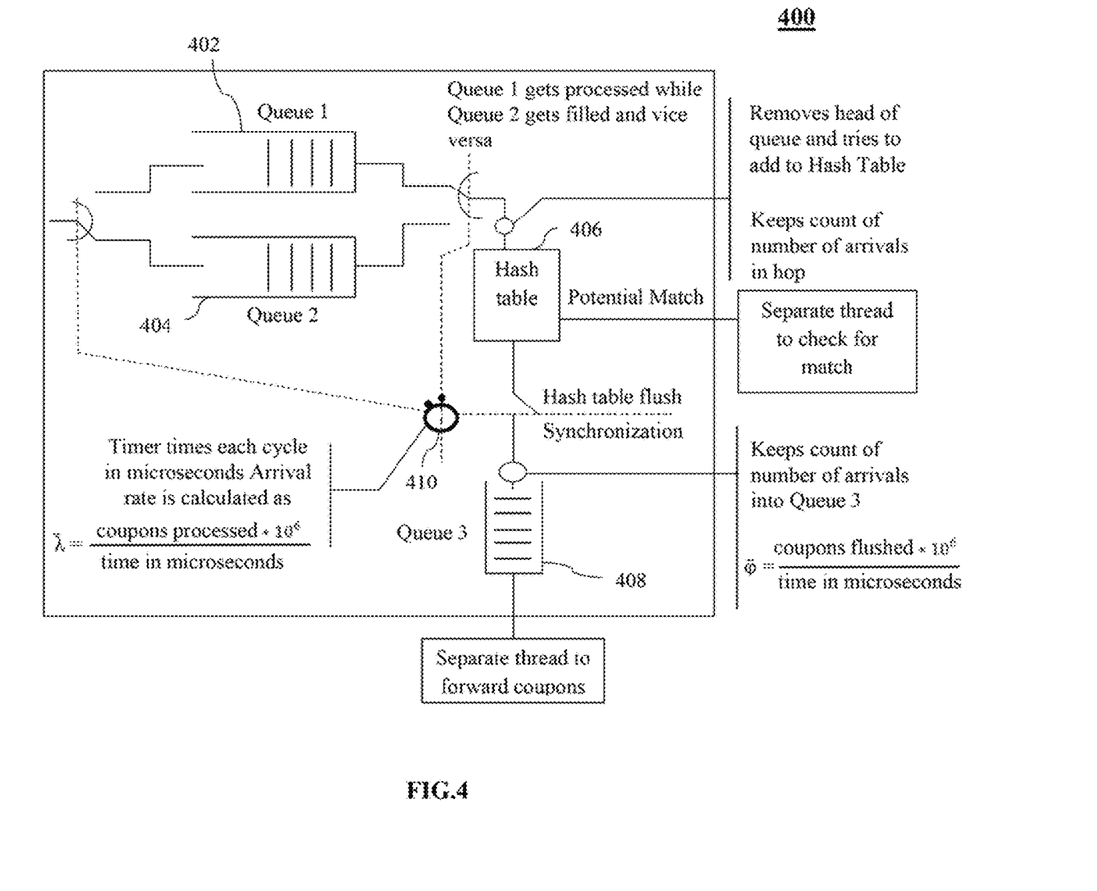
FIG. 4 illustrates a schematic representation of a single thread implementation of PETS, according to one embodiment herein.

FIG. 4 illustrates a schematic diagram depicting a single thread implementation of PETS, according to one embodiment herein. With respect to FIG. 4, the PETS mechanism processes the coupons that a node receives. The mechanism is designed to be extremely fast and efficient to handle large volumes of coupons. The PETS comprises two ingress queue systems 402 and 404 to receive coupons, the hash table 406, the egress queue 408 from which the forwarding mechanism forwards coupons to neighboring nodes and the timer mechanism 410 to ensure a common base time value for the computation of λ and φ. Where, $$\lambda = \frac{couponsprocessed * 10^6}{time \in microseconds}$$

$$\varphi = \frac{couponsflushed * 10^6}{time \in microseconds}$$

According to one embodiment herein, the mechanism also comprises a lightweight process and uses a dual queue mechanism. The lightweight process takes coupons from the head of the queue 402 or 404 and adds to the hash table 406 and another lightweight process clears the hash table 406 at the end of every hop and adds it to the egress queue 408. The mechanism processes one queue at a time. Meanwhile, all incoming coupons are diverted to another queue to avoid any loss of coupon due to processing time. The mechanism processes each queue after pre-defined time duration. Once a queue is empty the incoming requests are forwarded to the other empty queue and the mechanism starts processing coupons from another queue. The usage of dual queues and possibility to process the queue after a predefined time interval ensures that each processing node can process all the incoming coupons without performing clock synchronization across all nodes in a distributed network.

According to one embodiment herein, the lightweight process that takes coupons from the head of the queue 402 and 404 and adds to the hash table 406 also gathers arrival rate statistics and identifies potential matches which it transfers to a separate thread to verify. This process spans the boundary between the ingress queue 402 and 404 and the hash table 406.

According to one embodiment herein, the lightweight process that clears the hash table 406 at the end of every hop also gathers forward rate statistics.

According to one embodiment herein, once the PETS mechanism identifies a set of matching coupons, the matched coupons are forwarded to a Matching mechanism that operates on a separate thread. This matching mechanism operates as follows. The matching mechanism first uses a couponType field to verify the presence of a pair of L- and R-coupons. If not, an error message is returned and the two coupons are not deleted from the hash table. Otherwise, the mechanism proceeds to the next step.

According to one embodiment herein, the SQ processor is designed to handle large volumes of coupons and is highly efficient. The SQ processor comprises a single ingress queue to receive coupons. The coupons from the head of the ingress queue are taken and added to a hash table. A counter is provided in the SQ processor for counting the number of coupons arriving at each node. The coupons in the hash table are compared to identify potential match of L and R coupons. A flush queue is also provided in the SQ processor to identify coupons that need to be deleted from the hash table. The unmatched coupons are added to an egress queue for forwarding to other nodes and the potentially matched coupons are forwarded to a matching algorithm to confirm exact match between the L and R coupons in order to reach consensus amongst the nodes.

Figure 5:
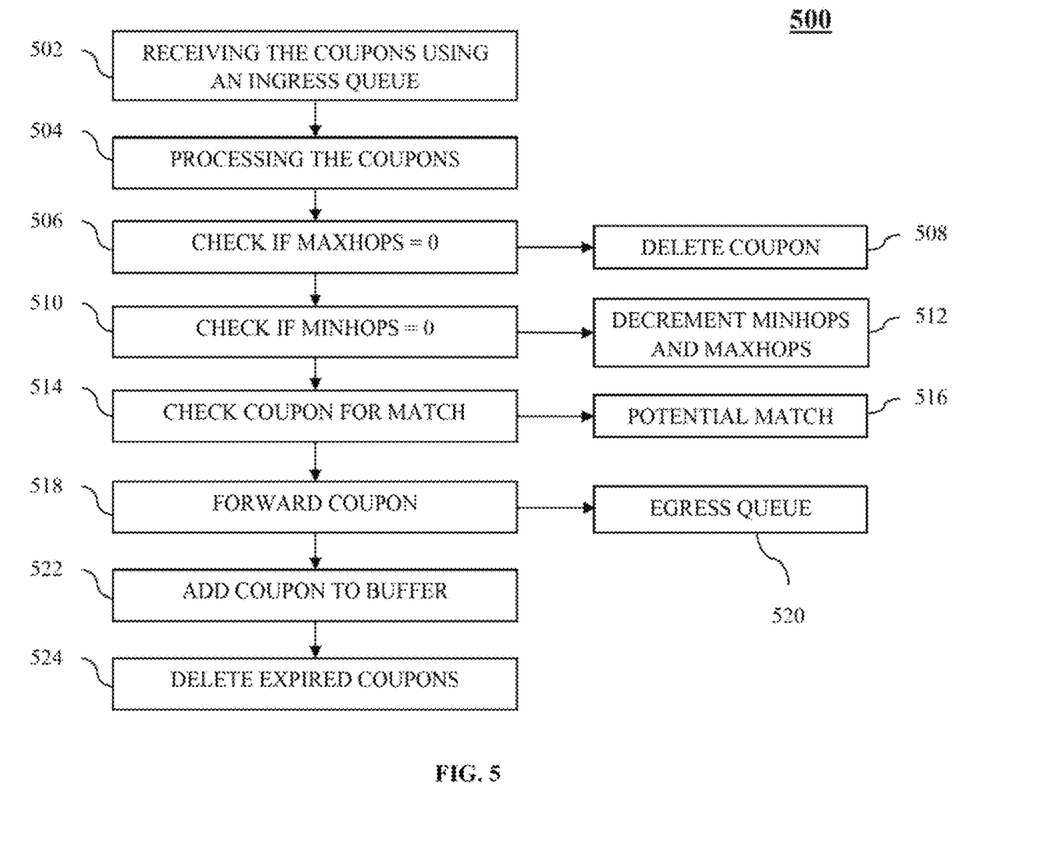
FIG. 5 illustrates a flowchart depicting a method for processing coupons using SQ processor, according to one embodiment herein.

FIG. 5 illustrates a flowchart depicting a method for processing coupons using SQ processor, according to one embodiment herein. With respect to FIG. 5, the method comprises the steps of receiving the coupons using an ingress queue (502). The method also comprises processing the coupons (504). The maximum hop (maxhop) field is checked to be equal to zero (506). If it is zero, the coupon is deleted as it has exhausted the total number of maximum hops allowed in the network (508). The coupon identifier for minimum hops (minhops) is checked to be zero (510). If its value is not equal to zero, then the minimum hop and maximum hop count is decremented (512). The coupon is checked for potential match (514). The potential match is identified when the hash value part matches (516). The coupon is then forwarded (518) and added to the egress queue (520). The coupon is added to a buffer (522) and the expired coupon is deleted (524).

According to one embodiment herein, in SQ processor the coupons are processed one at a time and fed sequentially by the single ingress queue. If not, the coupon is forwarded and a copy of the coupon is stored locally till it expires. The copy of the coupon that gets stored in the node's buffer (hash table) is called as the stored coupon. The other copy that gets forwarded is called as the travelling coupon. Since the coupons are both forwarded and stored in a PCRW, collisions occur only in two scenarios. The first scenario is being collision of a travelling L coupon with a stored R coupon and the second being collision of a travelling R coupon with a stored L coupon. This ensures that for every leader election request, two leaders are elected by default. SQ processor is implemented as a single thread.

According to one embodiment herein, PETS processor is designed for high concurrency. The PETS processor also easily handles simultaneous leader election requests and higher coupon arrival rates. This leads to a very high system throughput in terms of the number of leaders elected in a given time. SQ processor on the other hand, is a much faster and efficient mechanism that elects leaders quickly. SQ is capable of achieving low latencies and is effectively used in traditional linear leader election scenarios.

According to one embodiment herein, the matching mechanism then checks to see if the number of data elements contained in the R-coupon is equal to the number of parameters required by the code in the L-coupon. If these are different, an error message is returned and the two coupons are not deleted from the hash table. Otherwise, the mechanism proceeds to next step. The function in the L-coupon is run using the data elements in the R-coupon. If the function fails to run or reports error, the matching mechanism returns an error message and the two coupons are not deleted from the hash table. Otherwise, the mechanism proceeds to the next step.

According to one embodiment herein, in the next step the value returned by the function (always a valid hash) is compared with the value of the match hash. If these match, the matching mechanism removes the two coupons from the hash table and forwards the information contained in the two coupons to a higher level protocol. If these do not match, then the matching mechanism returns an error message and the two coupons are not deleted from the hash table.

According to one embodiment herein, the CRW mechanism is quantum resistant as the code in the L-coupon implements a non-unary function. The decryption of the match hash to get the expected answer is not possible even using a quantum computer. As there are potentially an infinite number of combinations of values that when plugged into the non-unary function give the right result. The quantum system is deficient of additional information to determine the right combination of values.

According to one embodiment herein, every node implements a coupon forwarding mechanism. There are two scenarios observed in coupon forwarding. In the first scenario, the forwarding node is a source vertex. In this case, for each CRW generated by the node, the source vertex creates a set of L- and R-coupons, selects two neighbors at random and sends the L-coupon to the first one and the R-coupon to the second. In case the node has only one neighbour then the L-coupon is sent first, a random integer (R) is generated. The node further waits for R hops according to own internal PETS mechanism and then sends the R-coupon.

In the second scenario, the forwarding node is not the source vertex. In this case, the node appends its visited signature to the pathList on the coupon and uses one of the following forwarding algorithms to identify the node to forward the coupon. These algorithms are Uniform Forward, Delay Forward and Adaptive Delay Forward.

According to one embodiment herein, in case of Uniform Forward, the node generates an integer random number between 1 and d (both included) using the uniform probability distribution. Here, d is the number of neighbors. The node then forwards the coupon to the node at the corresponding index in neighbourList. The variance in the probability of collision across vertices is not very low for the Uniform algorithm as per observation for non complete connected networks. This implies that the corresponding consensus mechanism tends to be less fair. To mitigate this issue, the Delay Forward and Adaptive Delay Forward algorithms are developed.

Figure 6:
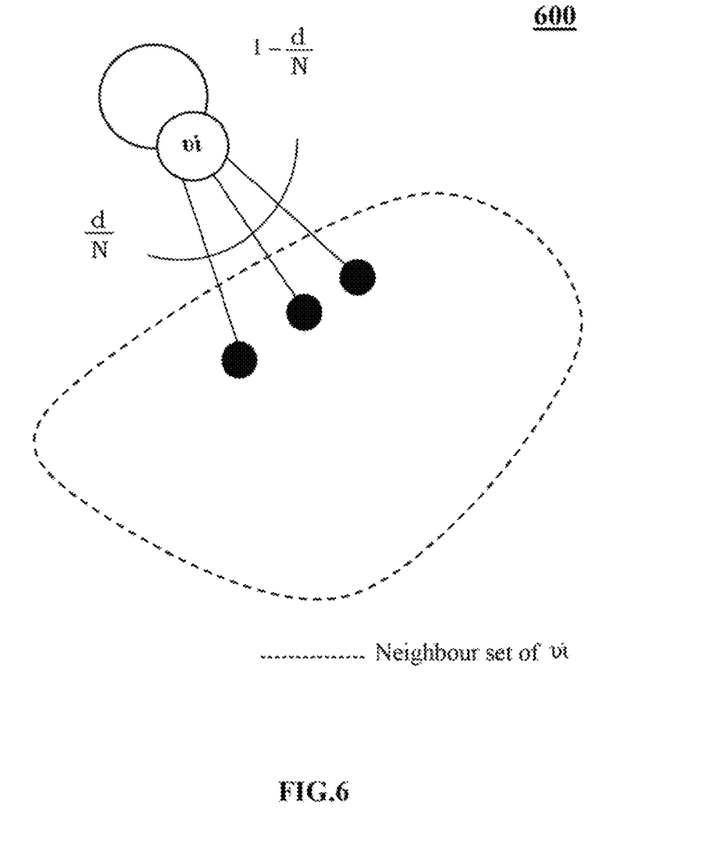
FIG. 6 illustrates a schematic representation of a coupon forwarding process using delay forward algorithm, according to one embodiment herein.

According to one embodiment herein, in case of Delay Forward, the Delay Forward algorithm is applied only in networks whose size is known at all time and whose densities are fairly high (typically 0.6 and above). This is a fair assumption in centrally controlled distributed systems such as permissioned blockchain networks. Also, as noted earlier, most such systems have high densities. The algorithm works as follows. The node generates a random number between 1 and N (both included). If the random number lies between 1 and d (the degree of the node), then the node forwards the coupon to the corresponding neighbour in the neighbourList. Note that d≤N. Otherwise, the coupon is retained for one more hop by transferring it to its input queue as illustrated in FIG. 6.

According to one embodiment herein, the Adaptive Delay Forward is a variant of the Delay Forward algorithm. One of the limitations of the Delay Forward algorithm is that it is applicable only in networks whose size is known at all time (typically a centralized network). An alternative mechanism is needed in networks that has high densities, but is decentralized (hence the number of nodes is unknown). Also, the size of a network keeps changing because nodes join and leave (for maintenance, due to faults or software upgrades, etc.) the network frequently and a mechanism is required to adapt to the changing dynamics of such networks. The Adaptive Delay Forward algorithm addresses this requirement.

Figure 7:
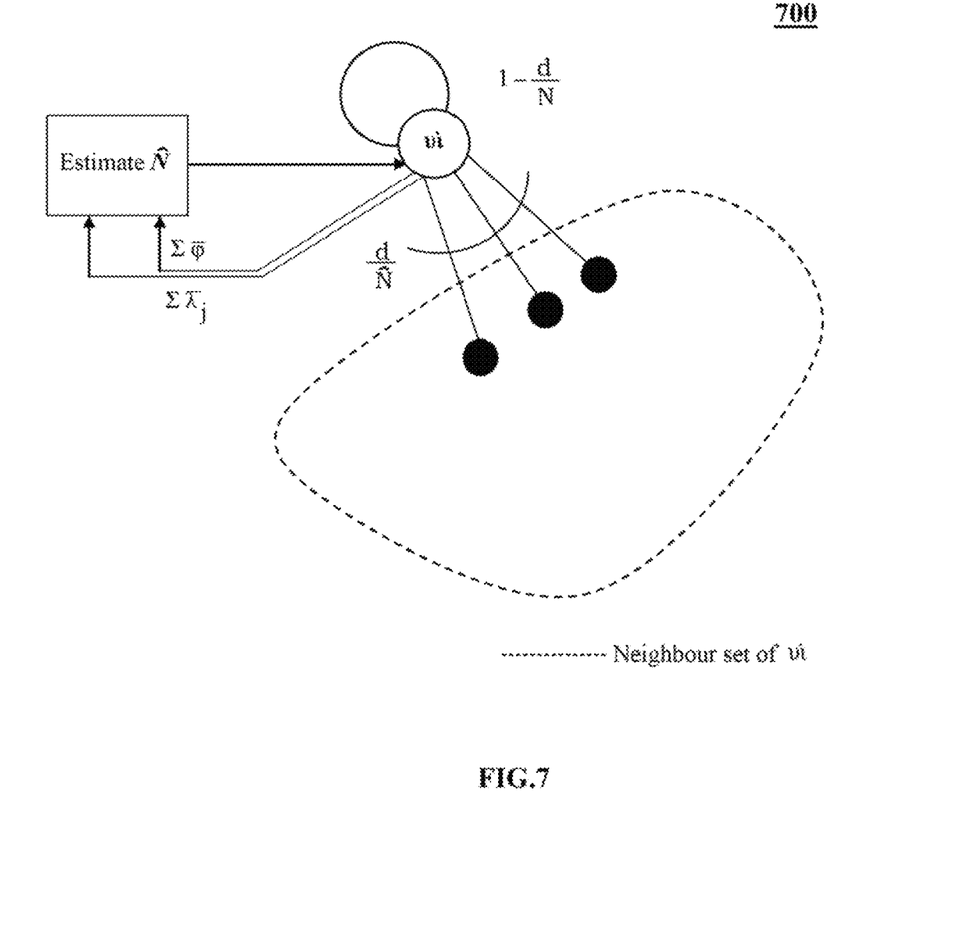
FIG. 7 illustrates a schematic representation of a coupon forwarding process using adaptive delay forward algorithm, according to one embodiment herein.

According to one embodiment herein, the algorithm works as follows. At every hop, the node estimates the value of the network size using a formula that depends on the mean arrival rate and mean forward rate of coupons. The estimated value of the network size is denoted as $N\hat{}$. $N\hat{}=1/(1-\text{forward rate}/\text{arrival rate})$. When the node comes up, it is initialized with the value $N\hat{}=2d$. The node then generates a random number between 1 and $N\hat{}$ (both included). If the random number lies between 1 and d (the degree of the node), then it forwards the coupon to the corresponding neighbour in the neighbourList. Otherwise, it retains the coupon for one more hop by transferring it to its input queue. This mechanism is depicted using FIG. 7.

The various embodiments herein provide a fair, high speed and lightweight consensus mechanism for leader election in distributed systems using coupons. The coupon processing method of the embodiments herein uses a dual buffer and a hash-table that optimizes time to process coupons and find matches. An estimation of PETS parameters like the hop time and buffer size optimizes memory and time requirements.

Further, the uniform forwarding algorithm used in the embodiments herein sets a novel benchmark for subsequent forwarding methods. The use of Delay forward algorithm makes the system fairer in permissioned networks. The Adaptive delay forward algorithm effects very high fairness even in open networks.

Thus, PoMA is very simple, lightweight, fast, secure, fair and hardware implementable. PoMA is designed to work in a network of constrained devices and is highly energy, memory and computationally efficient.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for providing a fair, high speed and lightweight consensus mechanism for use in distributed networks, the system comprises:
a peer-to-peer distributed network comprising a plurality of nodes (computing devices) connected over a communication network, wherein each node in the network is capable of communicating, with one or more of the other nodes in the network over a bi-directional communication link;
a Proof of Match Adaptive Algorithm (PoMA) module provided in each node; a coupon generation module provided in the PoMA module, wherein the coupon generation module, implemented by a processor, is configured, for generating one or more software coupons, and wherein each software coupon comprises a set of Left (L) and Right (R) coupons, and wherein each L and R coupon comprises a hash value part and one or more identifiers;
a coupon forwarding module provided in the PoMA module, wherein the coupon forwarding module, implemented by a processor, is configured for forwarding the L and R coupons generated by a source node by selecting two neighboring nodes at random and forwarding the L coupon to the first node and R coupon to the second node, and wherein the coupon forwarding module is further configured for forwarding the L and R coupons received from any other node using one or more algorithms based on the network topology, and wherein the one or more algorithms comprise uniform forwarding, delay forwarding and adaptive delay forwarding; and
a coupon processing module provided in the PoMA module, wherein the coupon processing module is configured for processing the received L and R coupons to identify a potential match of the coupons, and wherein the coupon processing module is farther configured for verifying potentially matched L and R coupons using one or more identifiers to determine an exact match, wherein determination of exact match is identified as consensus being reached amongst the nodes, and wherein the coupon processing module further comprises a Process Execution Time Synchronizer (PETS) processor and a Single Queue (SQ) processor for processing the received coupons, and wherein the PETS processor is used for coupon processing to improve network throughput by electing a plurality of leaders in parallel, and wherein the SQ processor is used for coupon processing to improve network throughput by reducing the time taken for leader election in a sequential manner.

2. The system according to claim 1, wherein the coupon forwarding module, implemented by a processor, is configured for using uniform forwarding algorithm for a complete network topology by randomly selecting a connected node and forwarding the coupon, and wherein the coupon forwarding module, implemented by the processor, is further configured for using delay forwarding algorithm for a high density non complete connected network topology with, known, number of nodes by randomly selecting a node in the network and forwarding the coupon only when the selected node is a connected node and retaining the coupon for a hop otherwise, and wherein the coupon forwarding module, implemented by the processor, is still further configured for using adaptive delay algorithm for a high density non complete connected network topology with unknown number of nodes by estimating the number of nodes in the network, randomly selecting a node out of estimated number of nodes and forwarding the coupon to the selected node only when the selected node is a connected node and retaining the coupon for a hop otherwise.

3. The system according to claim 1, wherein the PETS processor comprises a plurality of ingress queue buffers, an egress queue buffer and a hash table, and wherein the coupons from the head of one of the ingress queue are compared with the entries in the hash table to identify a potential match using coupon hash value, and wherein the coupons front the filled ingress queue buffer are processed first and the incoming requests are forwarded to another empty ingress queue buffer unless all the coupons from the filled ingress queue buffer are processed, and wherein the PETS processor is further configured for clearing the hash table at the end of every hop and adding the processed unmatched coupons to the egress queue buffer for forwarding to other neighbouring nodes.

4. The system according to claim 1, wherein, the SQ processor comprises a single ingress queue buffer, a hash table and an egress queue buffer, and wherein the coupons from the head of ingress queue buffer are taken sequentially and are compared with the entries In the hash table to identify a potential match using coupon hash value, and wherein the SQ mechanism is further configured for storing the copy of the coupon locally before forwarding to other neighbouring nodes, and wherein storing the copy of coupon at every node enables building up a path trace of the coupon to increase coupon matching probability.

5. A method for providing a fair, high speed and lightweight consensus mechanism for use in distributed networks, the method comprising the steps of:
generating two coupons namely left coupon (L-coupon) and right coupon (R-coupon) using a coupon generation module present, in a node (computing device) that is part of a peer-to-peer distributed network, wherein the coupon generation module, implemented by a processor, is configured, for generating one or more software coupons, and wherein each software coupon comprises a set of Left (L) and Right (R) coupons, and wherein each L and R coupon comprises a hash value part and one or more identifiers;
forwarding the L and R coupons in the network using coupon forwarding module to neighbouring nodes, and wherein each L and R coupon comprises a bash value part and one or more identifiers, wherein the coupon forwarding module, implemented by a processor, is configured for forwarding the L and R coupons generated by a source node by selecting two neighboring nodes at random and forwarding the L coupon to the first node and R coupon to the second node, and wherein the coupon forwarding module is further configured for forwarding the L and R coupons received from any other node using one or more algorithms based on the network topology, and wherein the one or more algorithms comprise uniform forwarding, delay forwarding and adaptive delay forwarding;
comparing the received coupons for identifying a potential match between the L and R coupons using coupon processing module and forwarding the potentially matched coupons to a matching algorithm to determine an exact match between the L and R coupons in order to reach consensus amongst the nodes using coupon processing module, and wherein the coupon processing module further comprises a Process Execution Time Synchronizer (PETS) processor and a Single Queue (SQ) processor for processing the received coupons, and wherein the PETS processor is used for coupon processing to improve network throughput by electing a plurality of leaders in parallel, and wherein the SQ processor is used for coupon processing to improve network throughput by reducing the time taken for leader election in a sequential manner.

6. The method according to claim 5, wherein the step of forwarding the L and R coupons in the network using coupon forwarding module further comprises the steps of:
   determining the network topology to be either complete, non complete connected with known number of nodes or non complete connected with unknown number of nodes;
   using a uniform forwarding algorithm in case the determined network topology is complete network and forwarding the L and R coupon to a randomly select connected node;
   using delay forwarding algorithm in case the determined network topology in non complete connected network with known number of nodes, and wherein the delay forwarding algorithm randomly selects a node from the network and forwards the coupon if the selected node is also a connected node and retains the coupon for a hop otherwise; and,
   using adaptive delay forwarding algorithm in case the determined network topology is non complete connected network with unknown number of nodes, and wherein the adaptive delay forwarding algorithm estimates the number of nodes in a network, randomly selects a node from the estimated size of network and forwards the coupon if the selected node is also a connected node and retains the coupon for a hop otherwise.

7. The method according to claim 5, further comprises the step of processing the received coupons using either PETS processor or SQ processor, and wherein the PETS processor is used for coupon processing to improve network throughput by electing a plurality of leaders in parallel, and wherein the SQ processor is used for coupon processing to improve network throughput by reducing the time taken for leader election in a sequential manner.

8. The method according to claim 5, wherein the step of processing the received coupons using PETS processor further comprises:
   filling the received coupons into an ingress queue that is empty from a plurality of ingress queues provided in the PETS processor;
   taking one coupon at a time from the head of the filled ingress queue and adding it to a hash table provided in the PETS processor;
   diverting all other received coupons to another ingress queue to avoid any loss of coupon due to processing time;
   comparing the coupons in the hash table using hash value part of each coupon to identify a potential match of the L and R coupons;
   adding the unmatched coupons to an egress queue for forwarding to other nodes; and forwarding the potentially matched coupons to a matching algorithm to confirm exact match between the I, and R coupons in order to reach consensus amongst the nodes.

9. The method according to claim 5, wherein the step of processing the received coupons using SQ processor further comprises:
   receiving the coupons using a single ingress queue provided in the SQ processor;
   taking the coupons from the head of ingress queue and adding to the hash table;
   comparing the coupons in the hash table using hash value part of each coupon to identify a potential match of the L and R coupons;
   comparing the coupons in the hash table using hash value part of each coupon to identify a potential match of the L and R coupons;
   adding the unmatched coupons to an egress queue for forwarding to other nodes; and
   forwarding the potentially matched coupons to a matching algorithm to confirm exact, match between the L and R coupons in order to reach consensus amongst the nodes.

* * * * *